(12) United States Patent
Boss et al.

(10) Patent No.: US 8,214,671 B2
(45) Date of Patent: Jul. 3, 2012

(54) MANAGING DEPENDENCIES AMONG OBJECTS OF A SYSTEM FOR ENERGY CONSERVATION

(75) Inventors: Gregory J. Boss, American Fork, UT (US); James R. Doran, New Milford, CT (US); Rick A. Hamilton, II, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 12/208,534

(22) Filed: Sep. 11, 2008

(65) Prior Publication Data

US 2010/0064155 A1 Mar. 11, 2010

(51) Int. Cl.
 *G06F 1/00* (2006.01)
 *G06F 1/26* (2006.01)
 *G06F 1/32* (2006.01)
(52) U.S. Cl. .................. 713/320; 713/300; 713/324
(58) Field of Classification Search .................. 713/300, 713/323, 324, 320
 See application file for complete search history.

(56) References Cited

U.S. PATENT DOCUMENTS

| 5,404,136 | A | 4/1995 | Marsden |
| 5,572,438 | A | 11/1996 | Ehlers et al. |
| 5,706,191 | A | 1/1998 | Bassett et al. |
| 5,761,083 | A | 6/1998 | Brown, Jr. et al. |
| 5,958,012 | A | 9/1999 | Battat et al. |
| 6,005,571 | A | * 12/1999 | Pachauri ........................ 715/764 |
| 6,178,362 | B1 | 1/2001 | Woolard et al. |
| 6,732,282 | B1 * | 5/2004 | Brelin ............................ 713/300 |
| 6,983,389 | B1 * | 1/2006 | Filippo .......................... 713/324 |
| 7,103,452 | B2 | 9/2006 | Retsina |
| 2002/0054125 | A1 * | 5/2002 | Salomon et al. .............. 345/781 |
| 2004/0003300 | A1 * | 1/2004 | Malueg et al. ................ 713/300 |
| 2005/0166094 | A1 * | 7/2005 | Blackwell et al. .............. 714/38 |
| 2006/0025908 | A1 * | 2/2006 | Rachlin .......................... 701/29 |
| 2006/0149976 | A1 * | 7/2006 | Vaserfirer ..................... 713/300 |

OTHER PUBLICATIONS

ENSITE, "EnSite Safari Suite," copyright 2008 EnSite Incorporated, www.capterra.com/energy-management-software/spotlight.

* cited by examiner

*Primary Examiner* — Thomas Lee
*Assistant Examiner* — Samantha Hoang
(74) *Attorney, Agent, or Firm* — Carl J. Lanuti; Ronald A. D'Alessandro; Keohane & D'Alessandro PLLC

(57) ABSTRACT

Under the present solution, dependencies and relationships of objects are stored and are updatable by consumers and optionally manufacturers through a local UI or web interface. These dependencies and relationships are stored in a "collection profile" which describes the capabilities of objects. When a request to reduce energy is received the system can query the collection profile to determine the downstream effect of reducing energy to a single object. The collection profile will identify which other objects rely on that object and would also need to have energy reduced. Being able to identify these linkages and effects of changes across the system will be critical for good energy management.

19 Claims, 5 Drawing Sheets

MANAGING DEPENDENCIES AMONG OBJECTS OF A SYSTEM FOR ENERGY CONSERVATION

CROSS-REFERENCE TO RELATED APPLICATIONS

The present application is related in some aspects to commonly owned and co-pending application entitled "Framework for Managing Consumption of Energy", which was filed on Sep. 11, 2008, and was assigned U.S. patent application Ser. No. 12/208,422, the entire contents of which are herein incorporated by reference. The present application is also related in some aspects to commonly owned and co-pending application entitled "Policy-Based Energy Management", which was filed on Sep. 11, 2008, and was assigned U.S. patent application Ser. No. 12/208,510, the entire contents of which re herein incorporated by reference.

FIELD OF THE INVENTION

This invention discloses an approach for managing dependencies among objects (e.g., devices) of a system. Specifically, the present invention provides a solution for energy management using linkages among objects.

BACKGROUND OF THE INVENTION

As energy prices continue to rise, companies and individuals are seeking ways to reduce consumption and manage shortage situations. Currently, methods for managing energy shortage situations are limited, as managing energy usage of objects in an infrastructure is a nascent industry. A few early solutions include: WebSphere XD, which allows application servers to be tuned down to lower energy consumption modes (WebSphere is a trademark of IBM Corp. in the United States and/or other countries); and objects may be connected to home appliances (e.g. air conditioner) that allow the energy company to turn off energy to the appliance when a shortage occurs. This only enables an on/off situation for selected objects. Currently, energy is provided to all objects in an equal manner. In a true utility fashion when an object is connected to the energy grid at a residence or place of business energy is indiscriminately supplied to that object. There is no preference given to one object over another.

In view of the foregoing, there exists a need for an approach that solves at least one of the deficiencies in the related art.

SUMMARY OF THE INVENTION

For optimal efficiency in an energy management system, it is beneficial to control the energy throttling among all objects in an intelligent manner. For enterprise and consumer environments, many objects can be linked and are dependent on each other. As such, adjustment of one piece of a system can have downstream effects on other items. For example, a swimming pool can have multiple dependent objects such as a filter, a chemical dispenser, a heater, etc. Being able to identify these linkages and effects of changes across the system will be critical for the energy manager. Under the present solution, dependencies and relationships are stored and are updatable by consumers and optionally manufacturers through a local user interface (UI) or web interface. These dependencies and relationships are stored in a "collection profile" which describes the capabilities of objects. When a request to reduce energy is received the system can query the collection profile to determine the downstream effect of reducing energy to a single object. The collection profile will identify which other objects rely on that object and would also need to have energy reduced.

A first aspect of the present invention provides a method for managing linkages among objects of a system, comprising: identifying a set of objects in the system; creating linkages among the set of objects based on known dependencies and relationships between the objects; receiving an energy conservation request; and managing energy to the set of objects based on associated energy policies and the linkages.

A second aspect of the present invention provides a system for managing linkages among objects of a system, comprising: a module for identifying a set of objects in the system; a module for creating linkages among the set of objects based on known dependencies and relationships between the objects; a module for receiving an energy conservation request; and a module for managing energy to the set of objects based on associated energy policies and the linkages.

A third aspect of the present invention provides a computer readable medium containing a program product for managing linkages among objects of a system, the computer readable medium comprising program code for causing a computer system to: identify a set of objects in the system; create linkages among the set of objects based on known dependencies and relationships between the objects; receive an energy conservation request; and manage energy to the set of objects based on associated energy policies and the linkages.

A fourth aspect of the present invention provides a method for deploying a system for managing linkages among objects of a system, comprising: deploying a computer infrastructure being operable to: identify a set of objects in the system; create linkages among the set of objects based on known dependencies and relationships between the objects; receive an energy conservation request; and manage energy to the set of objects based on associated energy policies and the linkages.

A fifth aspect of the present invention provides a computer-implemented method for managing linkages among objects of a system, comprising: identifying a set of objects in the system; creating linkages among the set of objects based on known dependencies and relationships between the objects; receiving an energy conservation request; and managing energy to the set of objects based on associated energy policies and the linkages.

A sixth aspect of the present invention provides a data processing system for managing linkages among objects of a system, comprising: a memory medium comprising instructions; a bus coupled to the memory medium; and a processor coupled to the bus that when executing the instructions causes the data processing system to: identify a set of objects in the system, create linkages among the set of objects based on known dependencies and relationships between the objects, receive an energy conservation request, and manage energy to the set of objects based on associated energy policies and the linkages.

BRIEF DESCRIPTION OF THE DRAWINGS

These and other features of this invention will be more readily understood from the following detailed description of the various aspects of the invention taken in conjunction with the accompanying drawings in which.

Figure 1:
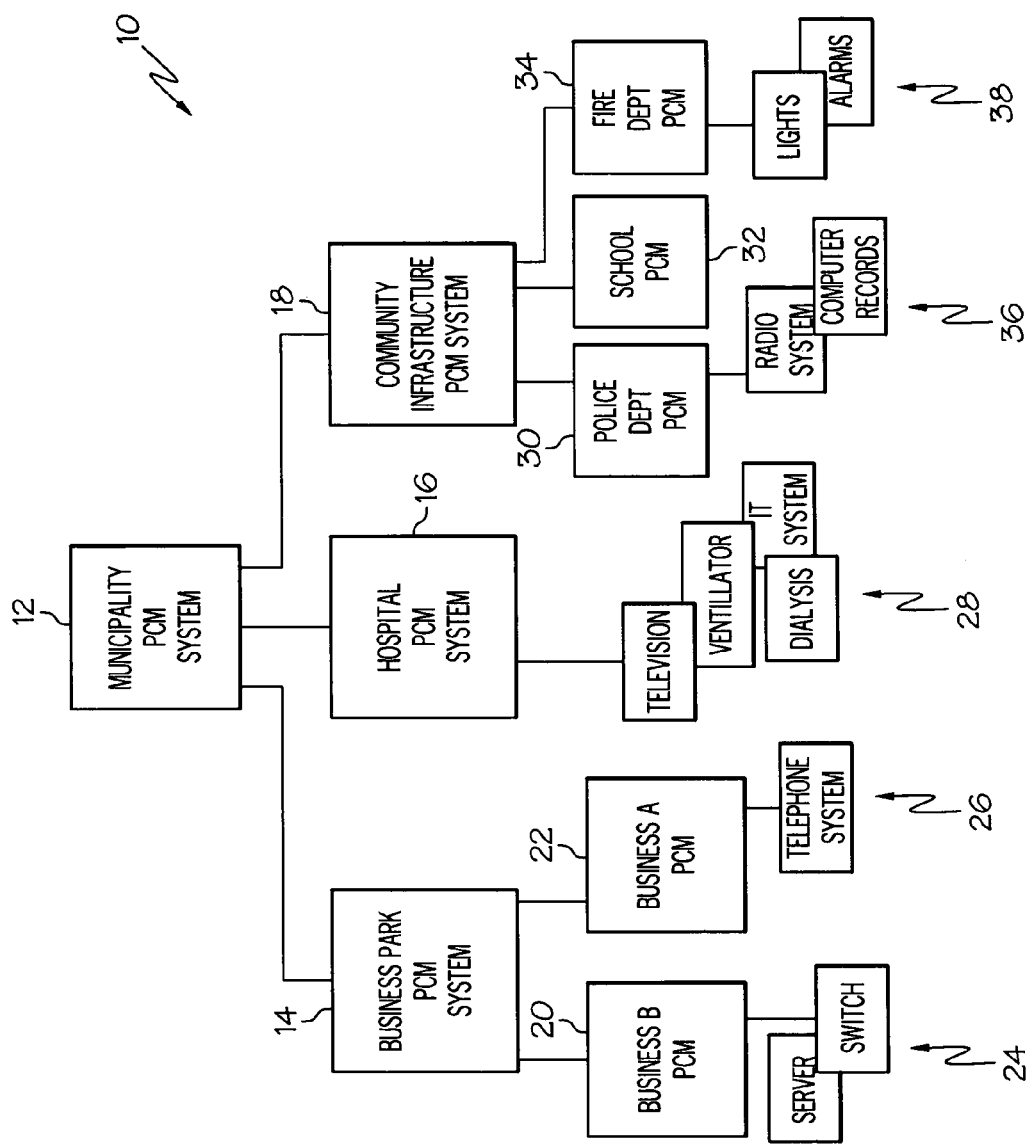
FIG. 1 depicts an illustrative policy management hierarchy according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:
I. General Description
II. Computerized Implementation
As used herein, the following terms have the associated meanings:
"Set"—a quantity of at least one.
"Object"—any device, group of devices, organization using devices, or software program running on a device that consumes energy.

I. General Description

As indicated above, for optimal efficiency in an energy management system, it is beneficial to control the energy throttling among all objects in an intelligent manner. For enterprise and consumer environments many objects can be linked and are dependent on each other. As such, adjustment of one piece of a system can have downstream effects on other items. For example, a swimming pool can have multiple dependent objects such as a filter, a chemical dispenser, a heater, etc. Being able to identify these linkages and effects of changes across the system will be critical for the energy manager. Under the present solution, dependencies and relationships are stored and are updatable by consumers and optionally manufacturers through a local UI or web interface. These dependencies and relationships are stored in a "collection profile" which describes the capabilities of objects. When a request to reduce energy is received the system can query the collection profile to determine the downstream effect of reducing energy to a single object. The collection profile will identify which other objects rely on that object and would also need to have energy reduced. Being able to identify these linkages and effects of changes across the system will be critical for good energy management.

Referring now to FIG. 1 a framework hierarchy 10 is shown. FIG. 1 is to demonstrate, among other things, that the present invention could be implemented in conjunction with any hierarchy of objects, regardless of complexity. In the example shown, energy control management systems/energy control manager (hereinafter PCM) are utilized on multiple levels. Municipality PCM 12 works in conjunction with business park PCM 14, hospital PCM 16, and community infrastructure PCM 18. Further, business park PCM 14 interacts with business A PCM 20 and business B PCM 22, each of which controls energy consumption with their own objects 24 and 26. Similarly, hospital PCM 16 controls energy consumption by objects 28. Community infrastructure PCM 18 is shown interacting with police department PCM 30, school PCM 32, and fire department PCM 34, which among themselves, manage objects 36 and 38. As can be seen, a PCM under the present invention can not only interact with objects, but also with other PCMs.

Figure 2:
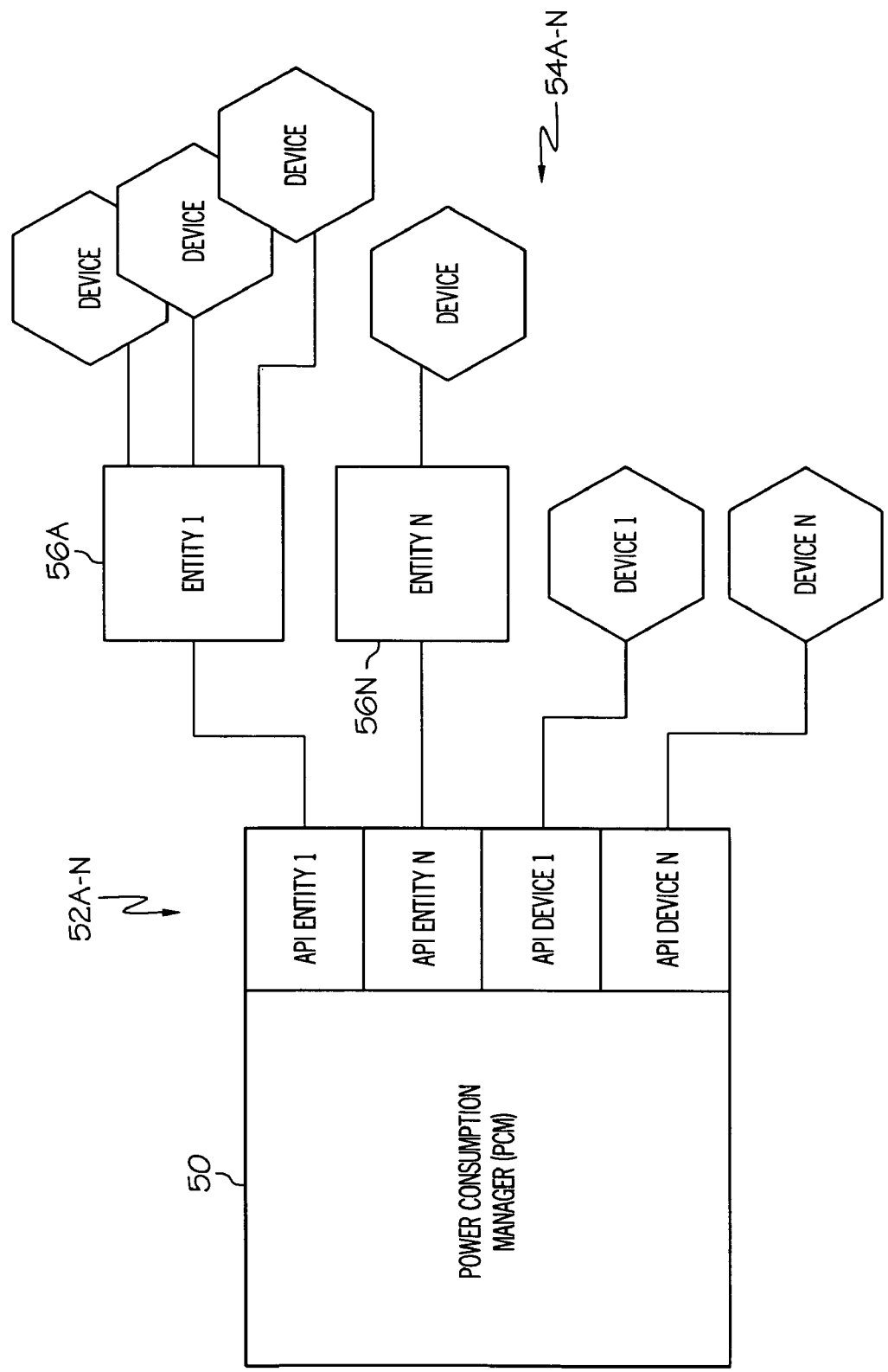
FIG. 2 depicts an interface to heterogeneous objects according to the present invention.

Referring now to FIG. 2, the functions of a PCM 50 will be described. As used in FIG. 2, entities 56A-N represent any business object that has one or more component/object. Sample entities may include a hospital, business or municipality. As such, devices 54A-N are each a piece of the overall system who's energy may be throttled. This may be a particular software application, piece of IT hardware (server, storage, networking switch, etc.), or other hardware (life support equipment, refrigerator, etc.). As further depicted, PCM 50 has a set of application programming interfaces (APIs) 52A-N which allow communication to occur between PCM 50 and devices 54A-N and/or entities 56A-N. Although not shown in FIG. 2, an API would also allow PCM 50 to interface with another PCM. Heterogeneous devices from different vendors may have very different interfaces. The technology described herein will interface to different devices, or to any known or future energy management standard. For example, the interface to communicate with IBM WebSphere XD software (WebSphere is a trademark of IBM Corp in the United States and/or other countries) may differ greatly from the interface for a medical device to manage energy to an anesthesia machine, which would differ from the interface to a refrigerator.

Under the present invention, each object, entity, etc. is identified and enrolled into the system. This may occur manually, through auto-discovery by PCM 50 or by device 54A-N self-enrolling to PCM 50. Once enrolled, PCM 50 maintains a database of objects and their attributes. Sample object attributes are as follows:
Object ID=0487
Object name="refrigerator01"
Average energy consumed=50
Throttle capabilities="on/off"
Quiesce first="no"

Regardless, this functionality may be implemented with a single energy management server, groups of servers, or a hierarchy of servers. A hierarchy is the preferred embodiment for an enterprise system, as that allows for delegation.

Once the objects have been identified, a consumer or system administrator will creates linkages among the objects, based on known dependencies and relationships between the objects. In general, the identification and/or linking of devices can be accomplished by accessing or querying a set of collection profiles. In general, collection profiles describe the capabilities of objects including, but not limited to:
1. Unique ID
2. Manufacturers Identification (model, part number, etc.)
3. Whether they are capable of consuming variable amounts of energy (amps), and whether they are only capable of being turned on or off
4. What other objects have dependencies on this object
5. Nature of dependency (hard/soft/variable)—can the dependant object operate at full or reduced capacity, is it dangerous to operate without the dependant or is it simply less effective
6. Dependencies on external factors including inside or outside temperature, time of day or week, time of season, number of occupants or concurrent users of an energy collection and so forth.

These collection profiles could be stored centrally in a database that is attached to the management system or they could be embedded locally in each object. If embedded locally the collection profile would require persistent memory or storage in each object. Many objects in the home already have this type of persistent storage (thermostats, computers, home automation systems controlling lights and other objects, etc.). Those objects that don't have this capability would require new function from the manufacturer or an in-line object between the energy cable and the outlet known in the art.

In addition to storing the collection profile, a communications protocol with an accompanying API is employed to query the object's collection profile.

To detect object dependencies, the system would query the collection profiles stored either locally in a database or query the network for all existing objects using the APIs described earlier. Detection could then be automatic in determining what objects are present. In this system every object would have a universal unique identifier (UNID) and typically a manufacturer's part number. If a new object was detected the system would query external systems on the internet for default collection profile information. After that step (or in the event it is unknown) the user is then given the option to customize or accept the default collection profile. Since many consumers have unique situations and dependencies among objects this gives them an opportunity to optimize the collection profile.

Figure 3:
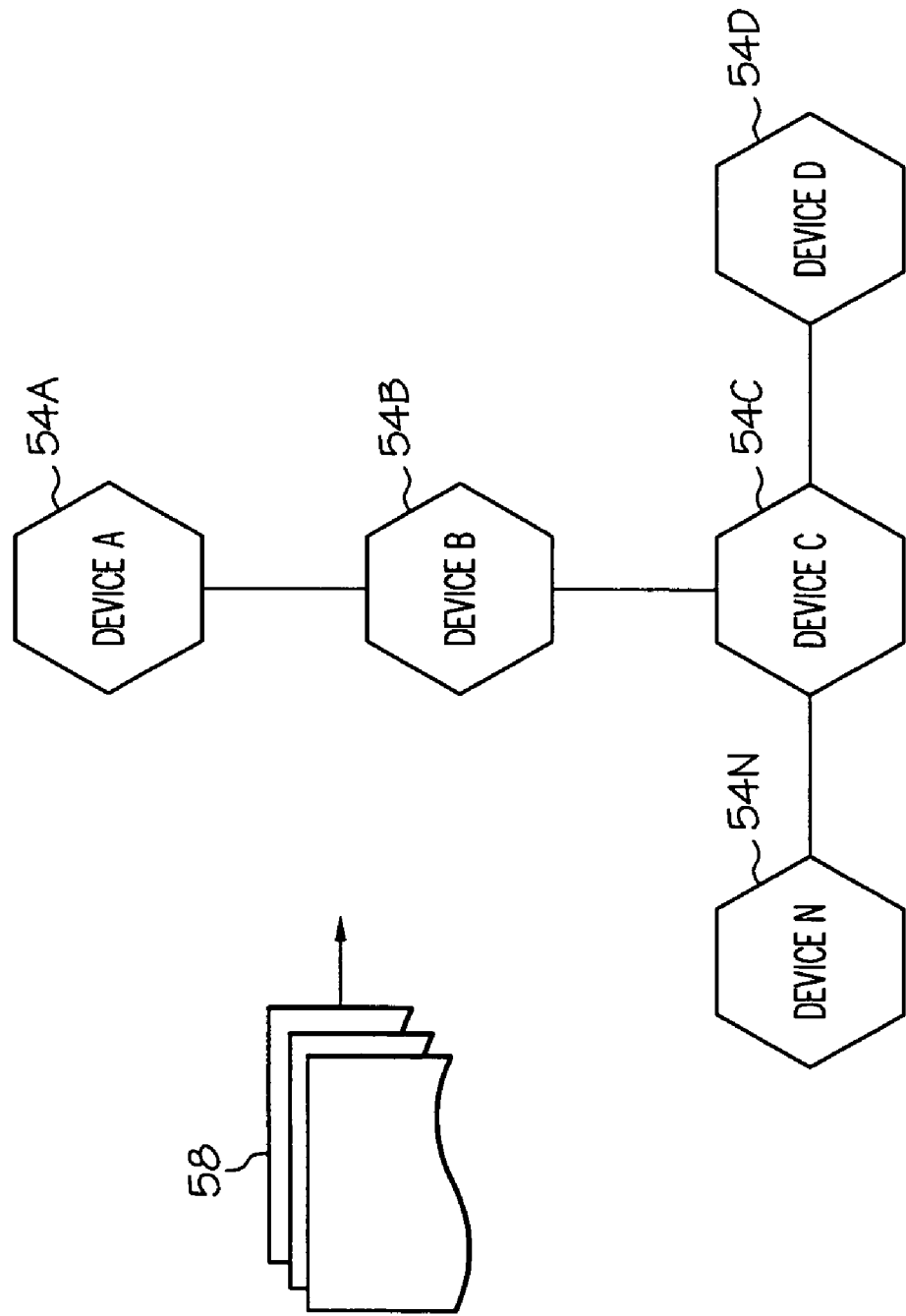
FIG. 3 depicts an illustrative graphical user interface (GUI) according the present invention.

Referring to FIG. 3, an example of linked objects is shown. In this example, the objects are devices 54A-N. As shown, device 54B is linked to device 54A, device 54C is linked to device 54B, and devices 54D and 54N are each linked to device 54C. Also shown in FIG. 3, is a set of policies 58. As will be further described below, these policies dictate how energy will be conserved in shortage situations.

Figure 4:
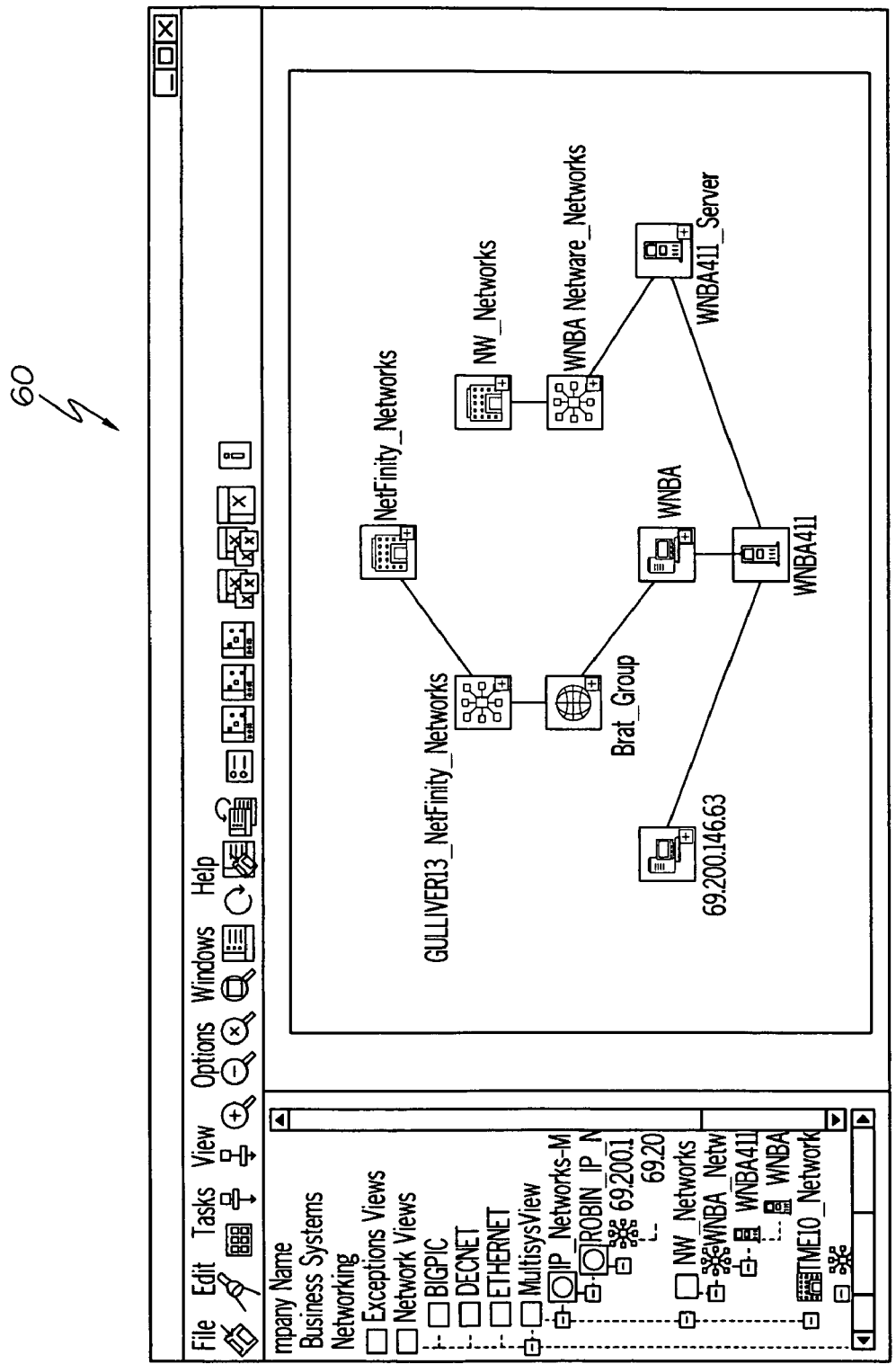
FIG. 4 depicts the linking of objects in according to the present invention.

Regardless, once all the objects are identified and dependencies and relationships are established the system will then be able to display those dependencies upon query and take actions based on energy reduction requests. From the perspective of the overall system or an outside request to reduce energy there exists logical or physical groupings of objects rather than individual objects themselves. In addition, each of these collections will have an Energy Policy such as policies 58 of FIG. 3. An in-depth discussion of such policies is discussed in the above-incorporated patent applications. Once the system determines which collection of objects needs to reduce its energy consumption the management system will apply simultaneous requests to each of the related objects in that collection according to the collection profile. In a typical embodiment, a graphical interface 60 such as that shown in FIG. 4 will display all objects and collections of objects. Graphical interface 60 will enable the user to easily modify or create dependencies and relationships among them and assign priorities (energy policies).

The following section will discuss various illustrative scenarios:

Consumer Home Scenario:

One example is a consumer swimming pool that has water heaters, chemical dispensers, water filters, lights, patio heater and water pumps. A consumer may consider the swimming pool to be a noncritical system in the event of an energy shortage. These systems all work together and if energy is shut off from the water filter it may make little sense to supply energy to the heating and pump systems. The pump and heating systems may have dependences on the current temperature or thermometers, while the chemical and cleaning systems may have dependencies on the pumps, the heating system may have a relationship to the electric pool cover position and so forth. The system may shut off underwater lights and heater together. If more energy still needs to be throttled, then shut off the pump as a secondary dependency.

Enterprise IT Scenario

Another example involves an enterprise environment that could be managed at the software level (load balancer/Enterprise Workload Manager (EWLM) linked to web server cluster linked to DB2 database) or hardware level (air conditioners linked to a section of the data center linked to specific servers, linked to lights, etc). Powering-off enough servers in a defined section may lead to turning off the air conditioner for that section, along with the lights, etc.

II. Computerized Implementation

Figure 5:
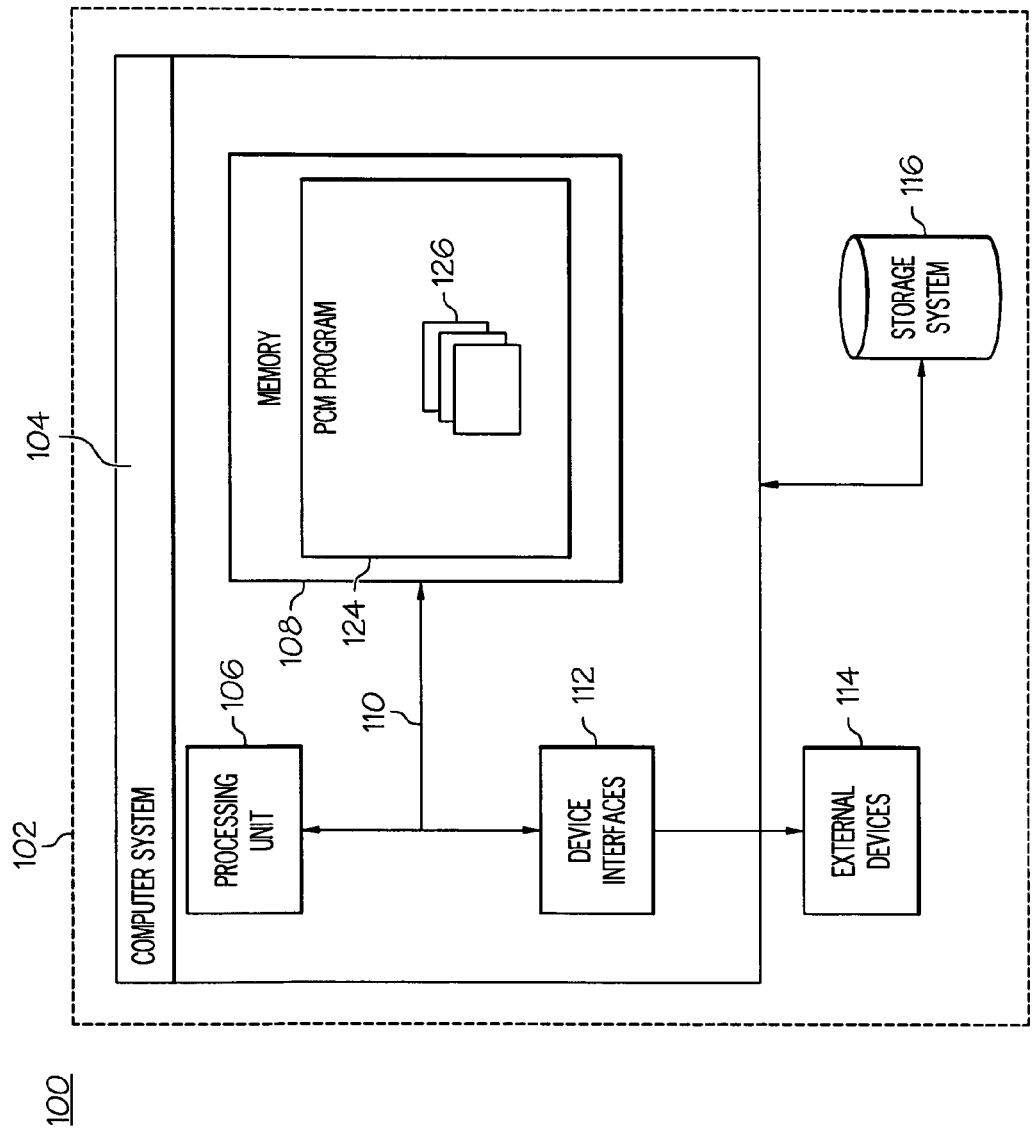
FIG. 5 depicts a more specific computerized implementation according to the present invention.

Referring now to FIG. 5, a computerized implementation 100 of the present invention is shown. As depicted, implementation 100 includes computer system/PCM 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

Computer system is intended to represent any type of computer system that may be implemented in deploying/realizing the teachings recited herein. In this particular example, computer system 104 represents an illustrative system that could represent a Policy Manager. It should be understood that any other computers implemented under the present invention will have similar components, but may perform different functions/have different software. As shown, computer system 104 includes a processing unit 106, a memory 108, a bus 110, and device interfaces 112. Further, computer system 104 is shown communicating with one or more external devices 114 that communicate with bus via device interfaces. In general, processing unit 106 executes computer program code, such linkage program 124, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices such as a kiosk, a checkout station, a keyboard, a pointing device, a display, etc.); one or more devices that enable a user to interact with computer system 104; and/or any devices (e.g., network card, modem, etc.) that enable computer system 104 to communicate with one or more other computing devices. Although not shown, computer system 104 could contain multiple processing units.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 2 can be included in computer system 104.

Storage system 116 can be any type of system capable of providing storage for information under the present invention. To this extent, storage system 116 could include one or more storage devices such as magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is linkage program 124, which has a set of modules 126. Set of modules 126 generally provide the functions of the present invention as described herein. Specifically (among other things), set of modules 26 is configured to: identify a set of objects in the system; create linkages among the set of objects based on known dependencies and relationships between the objects; receive an energy conservation request; and manage energy to the set of objects based on associated energy policies and the linkages.

While shown and described herein as an approach for managing linkages among objects, it is understood that the invention further provides various alternative embodiments. For example, in one embodiment, the invention provides a computer-readable/useable medium that includes computer program code to enable a computer infrastructure to manage linkages among objects. To this extent, the computer-readable/useable medium contains program code that implements each of the various processes of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 and/or storage system 116 (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide management of linkages among objects. In this case, the service provider can create, maintain, support, etc., a computer infrastructure, such as computer infrastructure 102 (FIG. 5) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method to enable a computer infrastructure to manage linkages among objects. In this case, a computer infrastructure, such as computer infrastructure 102 (FIG. 5), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 5), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:
1. A method for managing linkages among objects of a system, comprising:
   identifying a set of objects in the system;
   creating linkages among the set of objects based on known dependencies and relationships between the objects;

storing said linkages in a collection profile, the collection profile comprising descriptions of the capabilities of said linked objects;

receiving an energy conservation request;

querying the collection profile to determine the downstream effect of reducing energy to a single object; and managing energy to the set of objects based on associated energy policies and the linkages, the managing comprising controlling energy to at least one of the set of objects and to at least one other of the set of objects, said other set of objects is identified based on results of said collection profile query.

2. The method of claim 1, the set of objects comprising a plurality of devices.

3. The method of claim 1, the linkages being created via a graphical user interface.

4. The method of claim 1, the set of objects being identified manually.

5. The method of claim 1, the set of objects being identified via auto-discovery by the system.

6. The method of claim 4, the set of objects being auto-identified based upon a query of at least one profile corresponding to the set of objects.

7. The system of claim 4, the set of objects being auto-identified based upon a query of at least one profile corresponding to the set of objects.

8. A system for managing linkages among objects of a system, comprising:

a module for identifying a set of objects in the system;

a module for creating linkages among the set of objects based on known dependencies and relationships between the objects;

a module for storing said linkages in a collection profile, the collection profile comprising descriptions of the capabilities of said linked objects;

a module for receiving an energy conservation request; and a module for querying the collection profile, the module for querying being configured to determine the downstream effect of reducing energy to a single object; and a module for managing energy to the set of objects based on associated energy policies and the linkages, the module for managing being configured to control energy to at least one of the set of objects and to at least one other of the set of objects, said other set of objects is identified based on results of said collection profile query.

9. The system of claim 8, the set of objects comprising a plurality of devices.

10. The system of claim 8, the linkages being created via a graphical user interface.

11. The system of claim 8, the set of objects being identified manually.

12. The system of claim 8, the set of objects being identified via auto-discovery by the system.

13. A computer readable storage device containing a program product for managing linkages among objects of a system, the computer readable storage device comprising program code for causing a computer system to:

identify a set of objects in the system;

create linkages among the set of objects based on known dependencies and relationships between the objects;

store said linkages in a collection profile, the collection profile comprising descriptions of the capabilities of said linked objects;

receive an energy conservation request;

query the collection profile to determine the downstream effect of reducing energy to a single object; and manage energy to the set of objects based on associated energy policies and the linkages, the managing comprising controlling energy to at least one of the set of objects and to at least one other of the set of objects, said other set of objects is identified based on results of said collection profile query.

14. The computer readable storage device containing the program product of claim 13, the set of objects comprising a plurality of devices.

15. The computer readable storage device containing the program product of claim 13, the linkages being created via a graphical user interface.

16. The computer readable storage device containing the program product of claim 13, the set of objects being identified manually.

17. The computer readable storage device containing the program product of claim 13, the set of objects being identified via auto-discovery by the system.

18. The computer readable storage device containing the program product of claim 17, the set of objects being auto-identified based upon a query of at least one profile corresponding to the set of objects.

19. A method for deploying a system for managing linkages among objects of a system, comprising:

deploying a computer infrastructure being operable to:

identify a set of objects in the system;

create linkages among the set of objects based on known dependencies and relationships between the objects;

store said linkages in a collection profile, the collection profile comprising descriptions of the capabilities of said linked objects;

receive an energy conservation request;

query the collection profile to determine the downstream effect of reducing energy to a single object; and manage energy to the set of objects based on associated energy policies and the linkages, the managing comprising controlling energy to at least one of the set of objects and to at least one other of the set of objects, said other set of objects is identified based on results of said collection profile query.

* * * * *